United States Patent

Beard et al.

Patent Number: 5,879,802
Date of Patent: Mar. 9, 1999

[54] VEHICLE PANEL MATERIAL

[75] Inventors: Dennis J. Beard, Holland; Thomas J. Dellinger, Zeeland, both of Mich.

[73] Assignee: Prince Corporation, Holland, Mich.

[21] Appl. No.: 713,001

[22] Filed: Sep. 12, 1996

[51] Int. Cl.$^6$ .............................. B32B 7/00; B32B 15/00
[52] U.S. Cl. .................. 428/375; 428/175; 428/174; 428/184; 428/189; 428/190; 428/394; 428/395; 428/401; 428/332; 428/339; 428/372; 428/347; 428/36.1; 442/331; 442/334
[58] Field of Search ................................ 428/184, 174, 428/175, 189, 190, 903.3, 372, 34.7, 36.1, 375, 394, 395, 401, 332; 442/331, 334

[56] References Cited

U.S. PATENT DOCUMENTS

| | | |
|---|---|---|
| 2,142,463 | 1/1939 | Upson . |
| 2,409,951 | 10/1946 | Nootens . |
| 2,791,527 | 5/1957 | Gawrysiak . |
| 2,985,553 | 5/1961 | Anderson . |
| 3,345,245 | 10/1967 | Hanusa . |
| 3,396,070 | 8/1968 | Gambill et al. . |
| 3,433,526 | 3/1969 | Field et al. . |
| 3,447,199 | 6/1969 | Trimble . |
| 3,638,992 | 2/1972 | Forshee . |
| 3,647,588 | 3/1972 | Greig . |
| 3,756,904 | 9/1973 | Fredericks . |
| 3,848,886 | 11/1974 | Feustel et al. . |
| 3,930,665 | 1/1976 | Ikawa . |
| 4,020,207 | 4/1977 | Alfter et al. . |
| 4,077,821 | 3/1978 | Doerfling . |
| 4,093,482 | 6/1978 | Ogata et al. . |
| 4,119,749 | 10/1978 | Roth et al. . |
| 4,131,702 | 12/1978 | Alfter et al. . |
| 4,136,630 | 1/1979 | Fraser . |
| 4,150,186 | 4/1979 | Kazama . |
| 4,170,674 | 10/1979 | Matsuki . |
| 4,188,440 | 2/1980 | Doerer . |
| 4,214,788 | 7/1980 | Srock . |
| 4,256,797 | 3/1981 | Stamper et al. . |
| 4,312,430 | 1/1982 | Ohtani . |
| 4,352,522 | 10/1982 | Miller . |
| 4,363,848 | 12/1982 | Le Duc et al. . |
| 4,512,209 | 4/1985 | Linnemeier . |
| 4,531,609 | 7/1985 | Wolf et al. . |
| 4,545,172 | 10/1985 | Wardill . |
| 4,600,621 | 7/1986 | Maurer et al. . |
| 4,828,910 | 5/1989 | Haussing . |
| 4,840,832 | 6/1989 | Weinle et al. . |
| 4,886,696 | 12/1989 | Bainbridge . |
| 4,948,661 | 8/1990 | Smith et al. . |
| 4,950,439 | 8/1990 | Smith et al. . |
| 4,958,878 | 9/1990 | Kempkers . |
| 4,978,407 | 12/1990 | Ardissone . |
| 5,007,976 | 4/1991 | Satterfield et al. . |
| 5,026,586 | 6/1991 | Tabor . |

(List continued on next page.)

FOREIGN PATENT DOCUMENTS

| | | |
|---|---|---|
| 4015375 | 11/1991 | Germany . |
| 2828141 | 1/1979 | Netherlands . |
| 1170404 | 11/1969 | United Kingdom . |
| 1223598 | 2/1971 | United Kingdom . |
| 1494033 | 12/1977 | United Kingdom . |
| 1511397 | 5/1978 | United Kingdom . |
| 2104447 | 3/1983 | United Kingdom . |
| 2220612 | 1/1990 | United Kingdom . |

*Primary Examiner*—Richard Weisberger
*Attorney, Agent, or Firm*—Price, Heneveld, Cooper, DeWitt & Litton

[57] ABSTRACT

A vehicle panel material comprises a mixture of recycled, reground thermo-formable material and reprocessed headliner material which includes fibrous bats with polyester fibers, glass fibers and a thermo-setting resin. The method of manufacturing such material includes the steps of shredding thermo-formable material into strips; shredding headliner material comprising thermo-formable fibrous bats, glass fibers and thermo-setting resin; mixing and carding the thermo-formable material and headliner material into a mat; heating the mat to at least partially melt the thermo-formable material; and shaping the mat into a vehicle panel.

15 Claims, 4 Drawing Sheets

U.S. PATENT DOCUMENTS

| | | |
|---|---|---|
| 5,102,163 | 4/1992 | Ishikawa . |
| 5,108,147 | 4/1992 | Grimm et al. . |
| 5,139,300 | 8/1992 | Carriere . |
| 5,173,352 | 12/1992 | Parker . |
| 5,186,517 | 2/1993 | Gilmore et al. . |
| 5,275,865 | 1/1994 | Nicolay . |
| 5,290,622 | 3/1994 | Tanabe . |
| 5,298,694 | 3/1994 | Thompson et al. . |
| 5,308,678 | 5/1994 | Tsujimura et al. . |
| 5,445,130 | 8/1995 | Nichols . |
| 5,503,903 | 4/1996 | Bainbridge et al. . |
| 5,549,327 | 8/1996 | Rüsche et al. . |
| 5,564,744 | 10/1996 | Frost . |
| 5,591,289 | 1/1997 | Souders et al. .......................... 156/148 |
| 5,709,407 | 1/1998 | Stephens et al. . |

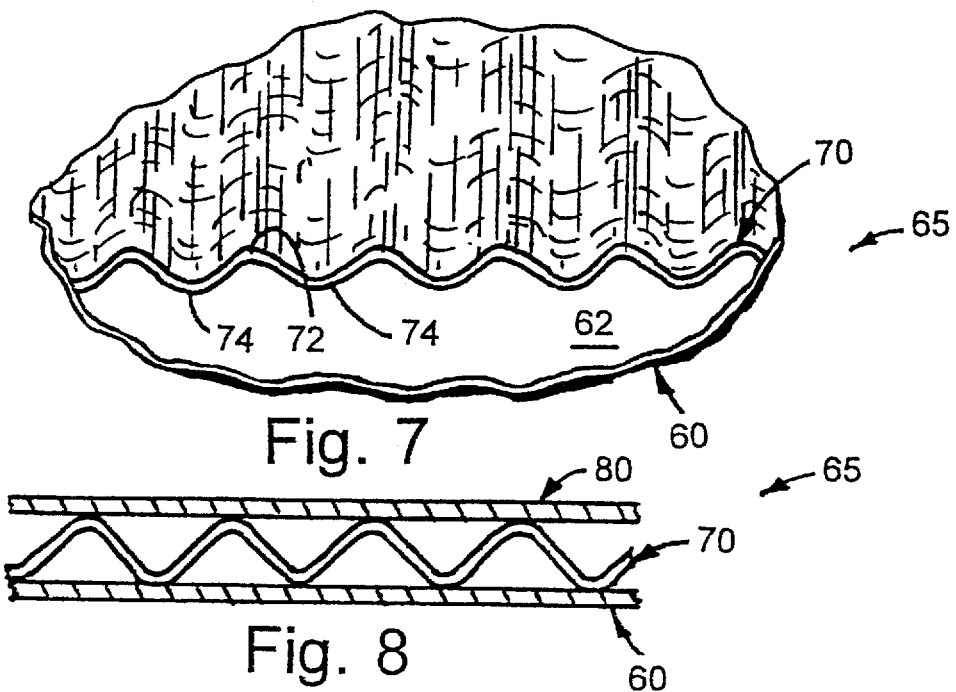

ns802

VEHICLE PANEL MATERIAL

BACKGROUND OF THE INVENTION

The present invention relates to material employed in vehicles for panels including those used for impact absorption in the event of an accident.

A wide variety of materials have been employed in vehicles for panels such a headliners, door panels and the like. U.S. Pat. No. 4,828,910 discloses one such material. Behind decorative panels padding or other impact absorbing techniques are employed for minimizing injuries in the event of an accident. Although air bags are now becoming commonplace, areas of the vehicle, such as the A-pillars and the headliner, need to meet or exceed the federally mandated head injury criterion (HIC(d)) performance which will be required for such areas in future vehicles. In the past, a variety of open and closed cell foam materials have been employed for areas such as the instrument panel. In order to provide head impact absorption in contemporary vehicles, padded visors are sometimes employed as shown in U.S. Pat. No. 4,958,878 for protecting the occupants in the front windshield area.

In recent years, headliners for vehicles have been integrally molded and have a variable thickness depending upon the area of the headliner. In some instances, efforts have been made to increase the thickness of headliners in areas where impact absorption may be important. With such increased thickness, however, the cost of manufacturing the headliner through a molding process increases as does the complexity of the size and shapes of the molds employed. Further, modern vehicles do not allow space for a significant additional conventional padding or cushioning materials in view of the more compact interior design and sharply slanting windshield.

U.S. patent application Ser. No. 08/529,366 filed Sep. 18, 1995, and entitled HEADLINER WITH INTEGRAL IMPACT ABSORPTION PANELS represents one new solution to the problem in which corrugated material is employed in the headliner in critical areas where impact absorption is desirable.

SUMMARY OF THE PRESENT INVENTION

The system of the present invention provides yet an even more economical solution to the formation of decorative panels including those for impact absorption by utilizing recycled material and waste material from headliner manufacturing and, in addition, provides a moldable material which can be configured to provide differing panel shapes and/or impact absorption characteristics.

Panel material embodying the present invention comprises a panel made of about 40–60% recycled, reground thermoplastic fibers mixed with about 60–40% reprocessed thermo-formable fibrous bats including polyester fibers, glass fibers and a thermo-setting resin used in the manufacture of headliners. In one preferred embodiment of the invention, the material comprises a 50% mixture of reground fibers and reprocessed headliner material which is carded to produce a mat which is compression moldable. The reground fibers are shredded, and the resultant mat is heated and compression formed in a cold tool to the desired panel shape. In one embodiment of the invention, the preformed shape is superimposed on a base which is an elongated arch-shaped member to conform to the shape of an A-pillar. In a preferred embodiment, the curvilinear projections are sinusoidal shaped. In another embodiment, a face sheet of planar material is bonded to a preformed shape including such sinusoidal projections.

Thus, with the panel material of the present invention, a relatively inexpensive material is employed and can be shaped to fit any desired area of the vehicle including those where impact absorption is desirable and molded to specifically fit tubular members such as an A-pillar of a vehicle or other structural members. These and other features, objects and advantages of the present invention will become apparent upon reading the following description thereof together with reference to the accompanying drawings.

BRIEF DESCRIPTION OF THE DRAWINGS

FIG. 7 is a fragmentary perspective view of an alternative embodiment of the invention; and FIG. 8 is a side elevational view of the structure shown in FIG. 7 mounted to a sheet metal vehicle body part.

DETAILED DESCRIPTION OF THE PREFERRED EMBODIMENT

Figure 1:
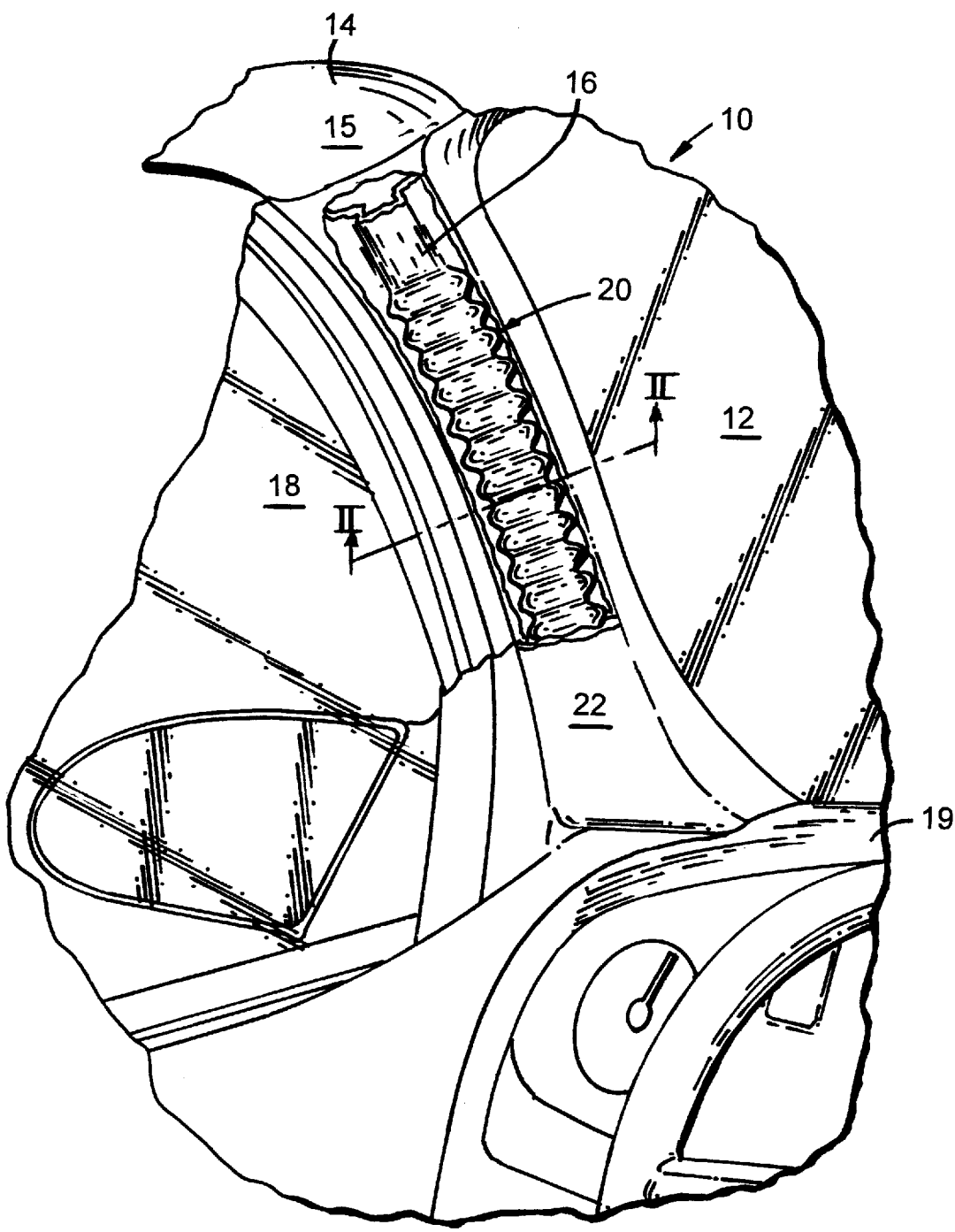
FIG. 1 is a fragmentary perspective view of a vehicle including a panel in the form of an impact absorption member of one embodiment of the present invention.
Figure 2:
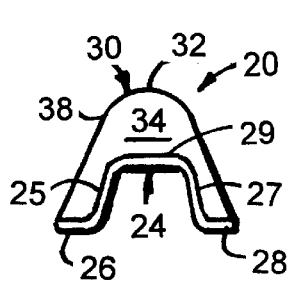
FIG. 2 is a cross-sectional view of the impact absorption member taken along section line II—II of FIG. 1.
Figure 3:
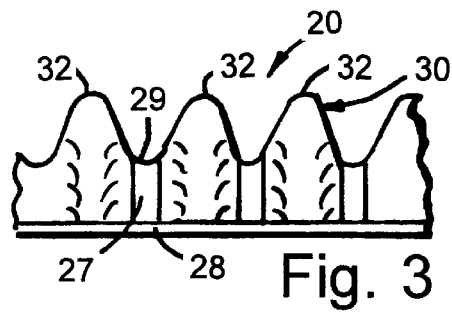
FIG. 3 is a fragmentary side elevational view of the structure shown in FIG. 2.
Figure 4:
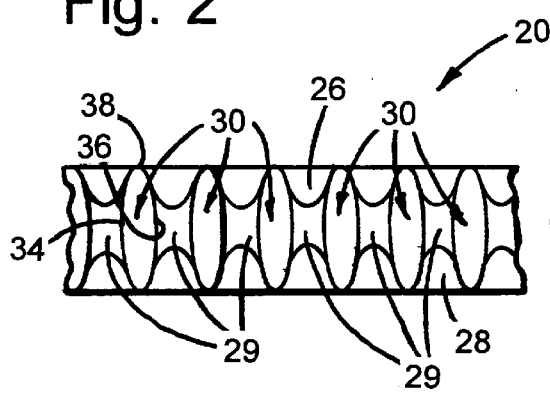
FIG. 4 is a top plan view of the impact absorption member shown in FIGS. 2 and 3.

Referring initially to FIG. 1, there is shown a vehicle 10, such as an automobile, including a windshield 12, a roof 14 supported to the vehicle body by a structural steel A-pillar 16 extending between the windshield 12 and the side window 18. The A-pillar extends, thus, from the vehicle frame at the side of the instrument panel 19 to the roof 14. The A-pillar 16 is covered by an impact absorption member 20 of the present invention which, in turn, is covered by a molded, decorative cover 22 to provide a clean trim appearance to the interior of the vehicle. Roof 14 is covered by a molded headliner 15 which can be an integral one-piece structure. The roof beam area above windshield 12 and other locations may also include a preformed impact absorption member such as that shown in FIGS. 7 and 8 described below. Turning now to FIGS. 2 and 3, the impact absorption member's geometric shape is first described followed by a description of its composition and method of manufacturing.

FIG. 2 is a cross-sectional view taken along section line II—II in FIG. 1 and shows the impact absorption member 20 as having a base 24 which is shaped to conform to the cross-sectional configuration of the generally rectangular A-pillar 16. Thus, base 24 includes a pair of outwardly projecting lower flanges 26, 28, upwardly extending walls 25, 27 and a top 29 all integrally formed. The flanges 26, 28 extend continuously along the length of the impact absorption member 20 as seen in FIG. 3; however, the sidewalls 25, 27 and top 29 are interrupted by integrally formed curvilinear projections 30 which, in the preferred embodiment, have a sinusoidal shape when viewed from the side (FIG. 3) and a generally rounded arch shape as viewed in FIG. 2.

In the embodiment of the invention of FIGS. 1–6, the sinusoidal wavelength (the distance from one peak 32 to the next adjacent peak 32) of the curvilinear projections 30 was 1". The depth of the projections from the top 29 of base 24 and peak 32 was, in the preferred embodiment, 1.2", while the overall width from edge to edge of the flanges 26 and 28 was 3.2". The thickness of the material was substantially uniform and comprises about $\frac{1}{16}$". The width of each of the rounded projections 30 from one sidewall 34 to an opposite sidewall 36 (FIG. 4) was approximately 0.5" with the edges 38 of the curvilinear projections being generally arch-shaped, as seen in FIG. 2, and rounded, as also seen in the top view of FIG. 4.

The material employed for manufacturing the impact absorption member 20 or other panels including decorative panels, such as headliners, door panels and the like, is preferably made of a mixture of recycled thermo-formable material in combination with waste material from the manufacture of a headliner from the material disclosed in U.S. Pat. No. 4,958,878, the disclosure of which is incorporated herein by reference. The headliner manufacturing involves the trimming of the final headliner shape and the scrap material from such trimming process is employed with the recycled thermo-formable material to form the crushable material employed for the impact absorption member 20. The method of manufacturing the material is now described in connection with FIG. 5.

Figure 5:
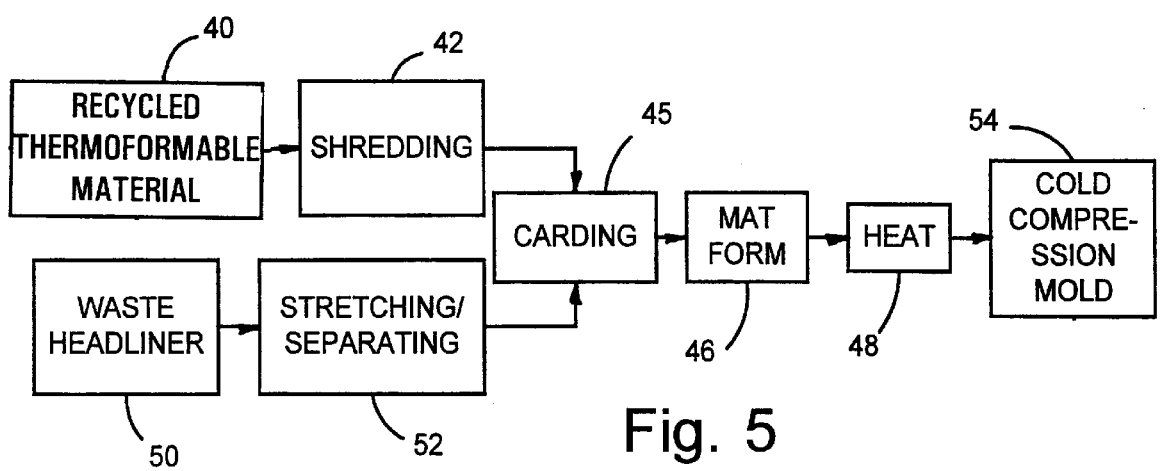
FIG. 5 is a block diagram of the method of manufacturing a panel of the present invention.

In FIG. 5, recycled thermo-formable material, such as waste fibers from carpet manufacturing is employed. The fiber density can be from 1–10 denier and be made of polypropylene, polyethylene, nylon or PET. This material is employed as shown by block 40 and is shredded into strips of about 1½–2 in length depending on the material being recycled. This step is indicated by the shredding step of block 42 utilizing a commercially available shredding machine. At the same time, a supply of scrap or waste headliner material is employed as indicated by block 50 and is stretched and separated into strips by pairs of rollers having needle-like projections as indicated by the step of block 52. The somewhat similar size and shapes of the thermo-formable material and headliner material are mixed and carded in a carding machine and process as indicated by block 45 to form a mat, as indicated by block 46, of, in the preferred embodiment, a mixture of about 50% reground thermo-formable material and about 50% of reprocessed headliner material. The thermo-formable material serves as a binder for the glass fibers of the headliner material and the blend of thermo-formable material and headliner material can vary from about 40–60%, respectively, to about 60–40%, respectively.

The resultant mat of blended material has a thickness of about ¾–1" and a mat area density of about 1800 g/m². The mat is heated to a temperature of about 420° in surface heaters which heat opposite sides of the mat sufficiently to melt and fuse the thermo-formable material with glass fibers. The heated blend retains the mat-like shape and is fed into a compression mold tool at room temperature (about 72° F.) which forms the final shape of the panel as indicated by block 54. If the panel is a decorative panel, such as a door panel, upholstery is bonded or laminated to the panel either simultaneously with the molding step 54 or as a separate step as indicated by block 55.

Figure 6:
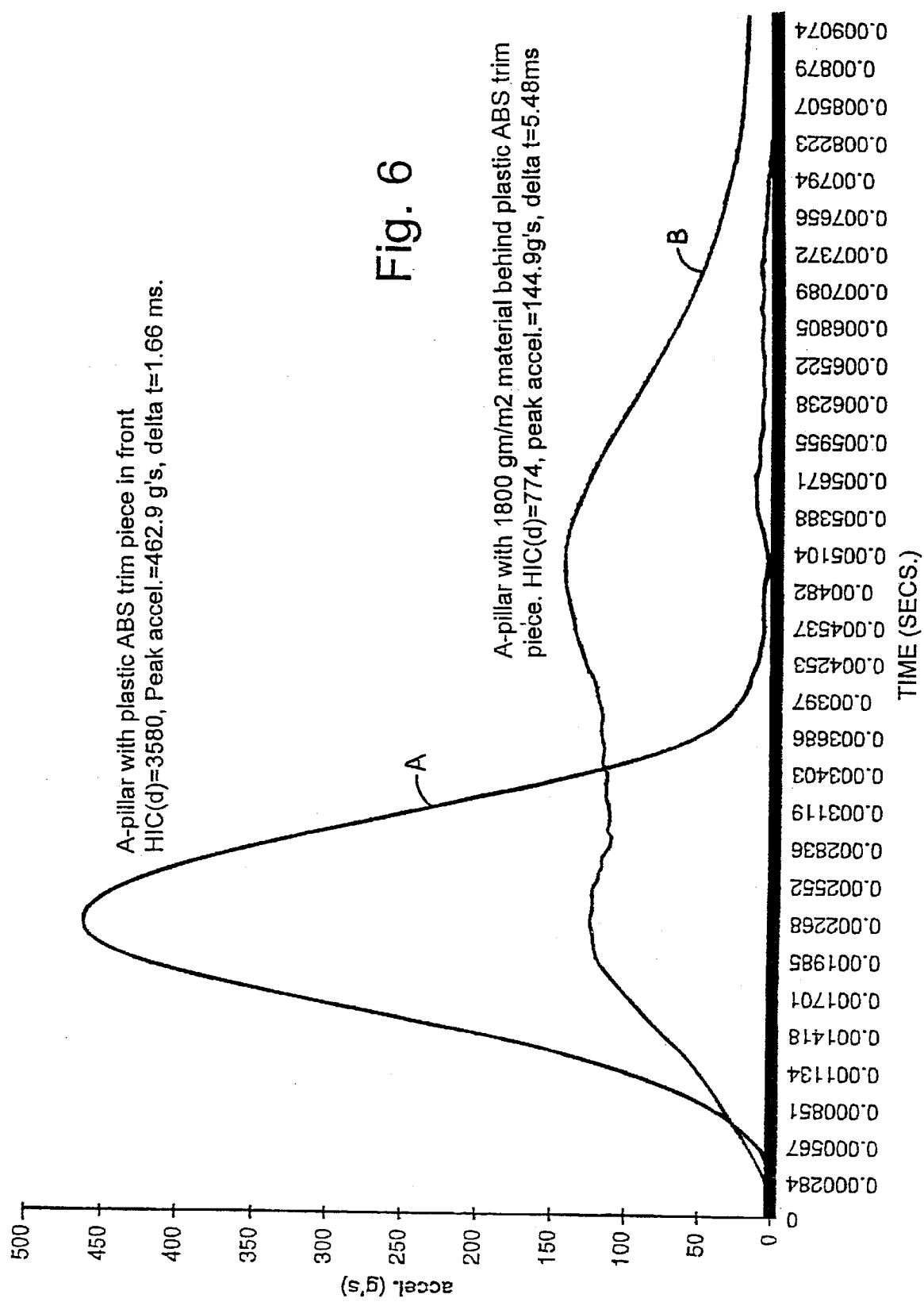
FIG. 6 is a G-force deceleration diagram of comparative tests.

It has been discovered that the curvilinear projections 30, such as shown in FIGS. 1–4, which are made of the material of the manufacturing process represented in FIG. 5 provide a slower and controlled deceleration of a head form eliminating sharp spikes in G-force loading in the event of an impact during an accident. The material itself is crushable and, although shaped to retain its configuration during incidental bumping, deforms and crushes during an impact which would otherwise cause head injuries. The decorative covering 22 hides the arch-like curvilinear projections 30 from view. FIG. 6 shows the impact force of a 10-pound head form under a simulated 15 m.p.h. crash. Waveform A represents the spike-shaped fatal deceleration encountered when the head form strikes a naked steel A-pillar. Waveform B shows the dramatic effect of the use of the impact absorption material of the present invention where the maximum G-force is less than ⅓ that of the uncovered A-pillar and exceeds the Federal Motor Vehicle Safety Standard No. 201 requiring an HIC(d)<1000.

Referring now to FIGS. 7 and 8, there is shown an alternative embodiment of the present invention in which an impact absorption member 65 includes elements 60 and 70. Element 60 is a planar sheet 60 of material, of the same type as manufactured by the process shown in FIG. 5, is made and has a thickness of about $\frac{1}{16}$". Bonded to the sheet 60 of such material is a washboard patterned sheet 70 of the same material also having a thickness of $\frac{1}{16}$" and which has a sinusoidal pattern of peaks 72 and troughs 74 with the troughs 74 being bonded to the upper surface 62 of sheet 60 by any number of bonding steps such as hot melt glue, ultrasonic welding, heat staking or the like. The composite structure forms an impact absorbing member which, as seen in FIG. 8, can be attached to a sheet metal member 80 on a vehicle, such as vehicle 10 shown in FIG. 1. Member 80 can be one of the roof beams or other area requiring impact absorption. The absorption characteristics of member 65 is similar to that shown in the diagram B of FIG. 6. In the embodiment shown in FIGS. 7 and 8, the distance between adjacent peaks of the patterned sheet 70 is about 1" while the distance between the peaks 72 and troughs 74 is approximately ¾". This construction is particularly well suited for mounting to planar surfaces such as a wide sheet metal beam 80 of a vehicle roof.

Planar sheet 60 in the preferred embodiment comprises the same thickness of material as manufactured by the process shown in FIG. 5, however, in some embodiments, a significantly thicker, lower density material could also be employed. Sheet 60, as manufactured by the process shown in FIG. 5, is a relatively stiff and rigid thin sheet. A relatively thick resilient sheet also could be employed, such a sheet having a thickness of, for example, ¾" and a significantly lower area density than sheet 60, which is the same as that described in connection with FIGS. 2–4, namely 1800 g/m².

Yet another embodiment of the invention is shown in FIG. 9 in which an impact absorption member 90, of the material made according to the process shown in FIG. 5, is formed in a three-dimensional or curved configuration to mate with a similarly curved body part of a vehicle. Member 90 is an integral sheet including a sinusoidal pattern of peaks 92 and valleys 94 which peaks can be spaced approximately 1" apart with the height between the peaks and valleys being approximately ¾" as in the embodiment shown in FIGS. 7 and 8. In this embodiment, however, the sheet alone is attached by bonding to a mating curvilinear surface of a vehicle.

Although in the preferred embodiment of the invention the reprocessed waste headliner material is employed, the shredded recycled thermo-formable material could be mixed with a similar percentage blend of glass fibers or polyethylene tetraphthalate (PET) fibers in some applications. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A vehicle panel formed from material comprising a mixture of thermoplastic material shredded into strips of about ½ to about 2 inches in length, and fibrous batting consisting of fibers and thermo-setting binders which are carded together to form a mat which is heated and molded into a panel shape.

2. The panel as defined in claim 1 wherein said thermoformable material comprises fibers made of one of the group of polypropylene, polyethylene, nylon or polyethylene terephthalate.

3. The panel as defined in claim 1 wherein said sheet has a thickness of about 1/16".

4. The panel as defined in claim 1 further comprising a filler which includes scrap headliner material comprising plastic and glass fibers bonded by a thermo-setting resin.

5. The panel as defined in claim 1 wherein said sheet is shaped to have a varying thickness from about 1/16" to about 3/4".

6. A panel member for a vehicle comprising a sheet of material made of a heated and compressed blend of about 40–60% thermoplastic material and about 60–40% of headliner scrap material comprising glass fibers, said sheet formed in the shape of a panel.

7. The panel as defined in claim 6 wherein said thermoformable material comprises fibers made of one of the group of polypropylene, polyethylene, nylon or polyethylene terephthalate.

8. The panel as defined in claim 6 wherein said sheet has a thickness of about 1/16".

9. The panel as defined in claim 6 wherein said filler comprises scrap headliner material comprising plastic and glass fibers bonded by a thermo-setting resin.

10. The panel as defined in claim 6 wherein said sheet is shaped to have a varying thickness from about 1/16" to about 3/4".

11. The panel as defined in claim 10 wherein said thermoformable material comprises fibers made of one of the group of polypropylene, polyethylene, nylon or polyethylene terephthalate.

12. A vehicle panel comprising a fused blend of thermoplastic fibrous material, and further including a filler having polyester fibers, glass fibers and thermo-setting resin, said blend molded into the shape of a vehicle panel.

13. The panel as defined in claim 12 and further including an upholstery layer on one side.

14. The panel as defined in claim 12 wherein said thermoformable material is selected from the group of polypropylene, polyethylene, nylon and polyethylene terephthalate.

15. The panel as defined in claim 12 wherein said filler is shredded headliner material.

* * * * *

UNITED STATES PATENT AND TRADEMARK OFFICE
CERTIFICATE OF CORRECTION

PATENT NO. : 5,879,802
DATED : March 9, 1999
INVENTOR(S) : Beard et al.

It is certified that error appears in the above-identified patent and that said Letters Patent is hereby corrected as shown below:

Column 3, line 29;

"1½-2" should be --½-2"--

Signed and Sealed this

Twentieth Day of July, 1999

Attest:

Q. TODD DICKINSON

*Attesting Officer*  *Acting Commissioner of Patents and Trademarks*